United States Patent
Ijima et al.

(10) Patent No.: US 12,548,573 B2
(45) Date of Patent: Feb. 10, 2026

(54) SPEAKER EMBEDDING DEVICE, SPEAKER EMBEDDING METHOD, AND SPEAKER EMBEDDING PROGRAM

(71) Applicant: NTT, Inc., Tokyo (JP)

(72) Inventors: Yusuke Ijima, Tokyo (JP); Kenichi Fujita, Tokyo (JP); Atsushi Ando, Tokyo (JP)

(73) Assignee: NTT, Inc., Tokyo (JP)

( * ) Notice: Subject to any disclaimer, the term of this patent is extended or adjusted under 35 U.S.C. 154(b) by 207 days.

(21) Appl. No.: 18/274,296

(22) PCT Filed: Feb. 2, 2021

(86) PCT No.: PCT/JP2021/003782
§ 371 (c)(1),
(2) Date: Jul. 26, 2023

(87) PCT Pub. No.: WO2022/168173
PCT Pub. Date: Aug. 11, 2022

(65) Prior Publication Data
US 2024/0312465 A1    Sep. 19, 2024

(51) Int. Cl.
*G10L 17/04* (2013.01)
*G10L 17/18* (2013.01)

(52) U.S. Cl.
CPC .............. *G10L 17/04* (2013.01); *G10L 17/18* (2013.01)

(58) Field of Classification Search
CPC .......... G10L 17/04; G10L 17/18; G10L 15/04
See application file for complete search history.

(56) References Cited

U.S. PATENT DOCUMENTS

| | | | |
|---|---|---|---|
| 11,417,343 B2* | 8/2022 | Cohen | G10L 17/20 |
| 2003/0144841 A1* | 7/2003 | Shao | G10L 15/22 |
| | | | 704/E15.04 |
| 2023/0055597 A1* | 2/2023 | Niiro | G06Q 30/0282 |

OTHER PUBLICATIONS

Takaki et al. (2015) "Deep Auto-encoder based Low-dimensional Feature Extraction using FFT Spectral Envelopes in Statistical Parametric Speech Synthesis" IEICE Technical Report, vol. 115, No. 346, pp. 99-104, ISSN 0913-5685, English Abstract only.

(Continued)

*Primary Examiner* — Huyen X Vo

(57) ABSTRACT

A speaker embedding apparatus includes processing circuitry configured to accept input of voice data, generate utterance unit segmentation information indicating a duration length for each utterance of a speaker in the input voice data, and use a duration length for each utterance indicated in the generated utterance unit segmentation information as training data and train a speaker identification model for outputting an identification result of a speaker when a duration length for each utterance of the speaker is input.

7 Claims, 7 Drawing Sheets

(56) References Cited

OTHER PUBLICATIONS

Sone et al. (2017) "Pre-training Method for DNN-based Speech Recognition and Synthesis Based on Bidirectional Conversion between Text and Speech" IPSJ SIG Technical Report, vol. 2017-MUS-115, No. 40, pp. 1-6, ISSN 2188- 8752, English Abstract only.
Snyder et al. (2018) "X-Vectors: Robust DNN Embeddings for Speaker Recognition" 2018 IEEE International Conference on Acoustics, Speech, and Signal Processing (ICASSP).
Otani et al. (2020) "Multi-language multi-speaker modeling for speech synthesis using generative adversarial networks" Lecture proceedings of the Acoustical Society of Japan, ISSN 1880-7658, pp. 695-696.
Japanese Patent Application No. 2022-579192, Office Action mailed Jun. 25, 2024, 3 pages.

* cited by examiner

SPEAKER EMBEDDING DEVICE, SPEAKER EMBEDDING METHOD, AND SPEAKER EMBEDDING PROGRAM

CROSS-REFERENCE TO RELATED APPLICATIONS

This application is a U.S. National Stage Application filed under 35 U.S.C. § 371 claiming priority to International Patent Application No. PCT/JP2021/003782, filed on 2 Feb. 2021, the disclosure of which is hereby incorporated herein by reference in its entirety.

TECHNICAL FIELD

The present invention relates to a speaker embedding apparatus, a speaker embedding method, and a speaker embedding program.

BACKGROUND ART

Conventionally, in the field of voice processing, techniques for vectorizing information on a speaker (speaker embedding techniques) have been proposed (for example, NPL 1 and the like). According to the techniques described above, by vectorizing information on a speaker and expressing the information on a continuous value space, various voice processing tasks such as speaker identification, speaker authentication, voice recognition, voice synthesis, and voice conversion can be performed.

In a conventional speaker embedding technique, first, a neural network is trained so as to identify a speaker from voice data of a large number of speakers. Subsequently, voice of a speaker to be converted into a speaker vector is input to the trained neural network, and information of an intermediate layer of the neural network is output as a speaker vector.

When training the neural network, an acoustic feature amount extracted from a voice (for example, a spectrum, a mel-frequency cepstrum (MFCC), or a mel-spectrogram of the voice) is generally used as an input feature amount.

CITATION LIST

Non Patent Literature

[NPL 1] David Snyder et al.: X-VECTORS: ROBUST DNN EMBEDDINGS FOR SPEAKER RECOGNITION, 2018 IEEE International Conference on Acoustics, Speech, and Signal Processing (ICASSP), 2018.4

SUMMARY OF INVENTION

Technical Problem

According to the technique described above, while features of a voiceprint of a speaker can be captured, it is difficult to capture features such as an utterance rhythm which is indicative of how the speaker speaks. Therefore, for example, there is a problem that performance may not be improved even when the voice processing tasks described above are to be performed using a speaker vector obtained by the technique described above.

In consideration thereof, an object of the present invention is to solve the problem described above and perform extraction of a speaker vector which captures an utterance rhythm of a speaker.

Solution to Problem

In order to solve the problem described above, a speaker embedding apparatus according to the present invention includes: processing circuitry configured to: accept input of voice data; generate utterance unit segmentation information indicating a duration length for each utterance of a speaker in the input voice data; and use a duration length for each utterance indicated in the generated utterance unit segmentation information as training data and train a speaker identification model for outputting an identification result of a speaker when a duration length for each utterance of the speaker is input.

Advantageous Effects of Invention

According to the present invention, a speaker vector which captures an utterance rhythm of a speaker can be extracted.

DESCRIPTION OF EMBODIMENTS

Hereinafter, modes (embodiments) for implementing the present invention will be described with reference to the drawings by dividing the modes (embodiments) into a first embodiment and a second embodiment. The present invention is not limited to each embodiment described below.

First Embodiment

Figure 1:
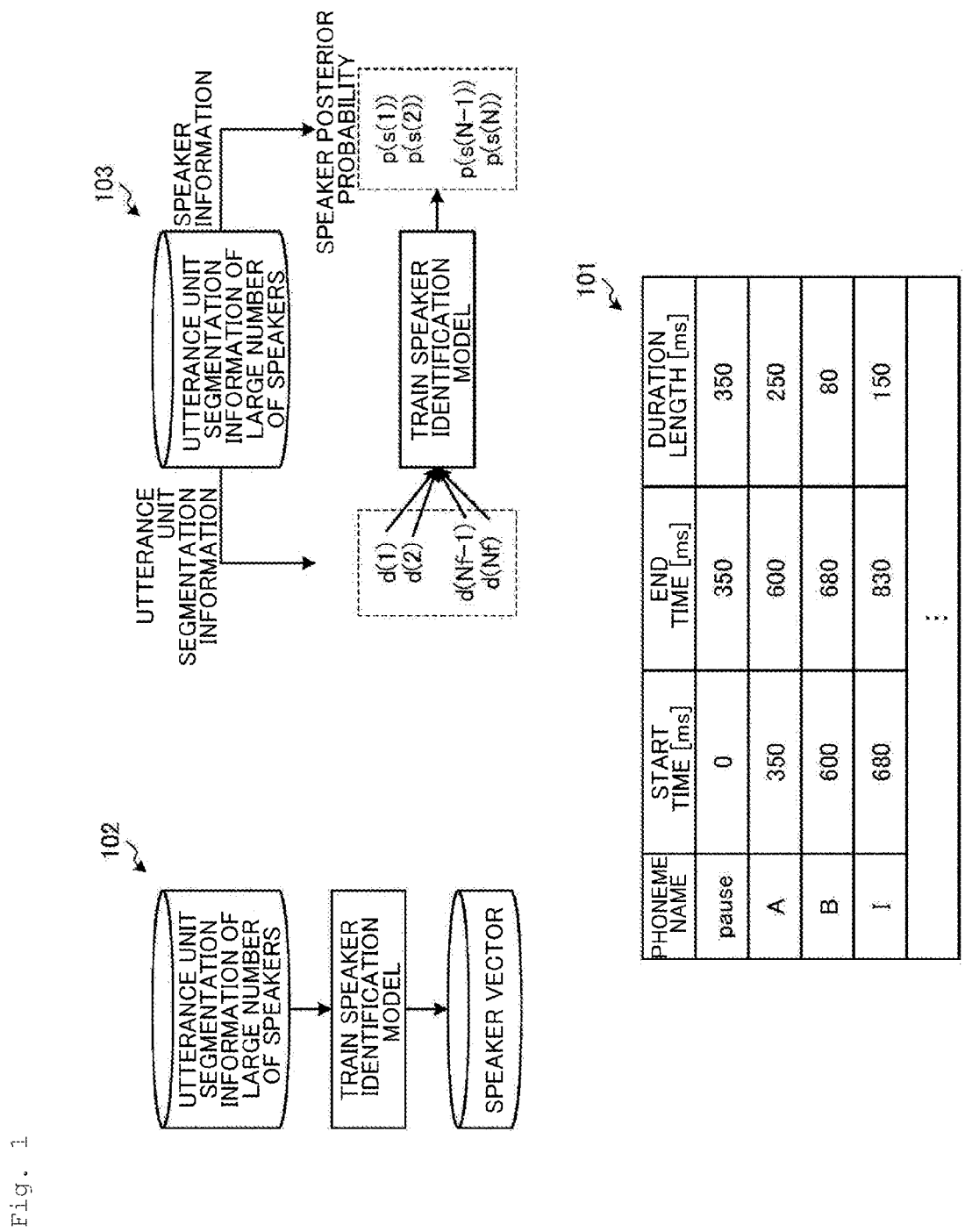
FIG. 1 is a diagram for explaining an outline of a speaker embedding system according to a first embodiment.

First, an outline of a speaker embedding apparatus (speaker embedding system) according to a first embodiment will be described with reference to FIG. 1.

A feature of the speaker embedding system (hereinafter, abbreviated as system) is that the system uses utterance unit segmentation information of a speaker as a feature amount to be input to a speaker identification model. For example, the utterance unit segmentation information is information indicating a duration length of an utterance unit (for example, a phoneme, a mora, a syllable, or a phrase) with respect to voice data of an utterer (refer to reference sign 101 in FIG. 1).

The system trains the speaker identification model using utterance unit segmentation information of a large number of speakers as indicated by reference sign 102 and a speaker vector is obtained using the speaker identification model after training.

The speaker identification model is a model which outputs an identification result of a speaker when a duration length for each utterance is input. For example, the speaker identification model is a model which outputs, when a sequence (d(1), d(2), . . . , d(Nf−1), d(N)) of duration lengths for respective utterances in utterance unit segmentation information is input, a speaker posterior probability (for example, p(s(1)), p(s(2)), . . . , p(s(N−1)), p(s(N))). This speaker identification model is realized by, for example, a neural network.

The system trains the speaker identification model using a duration length for each utterance indicated in the large amount of utterance unit segmentation information. Subsequently, the system inputs a duration length for each utterance of voice data to be converted into a speaker vector to the speaker identification model after training and outputs, as a speaker vector of the speaker, an output of an intermediate layer in the speaker identification model.

In this manner, using a duration length for each utterance of a speaker as a feature amount to be input to a speaker identification model, the system can extract a speaker vector capturing an utterance rhythm of the speaker.

Configuration Example

Figure 2:
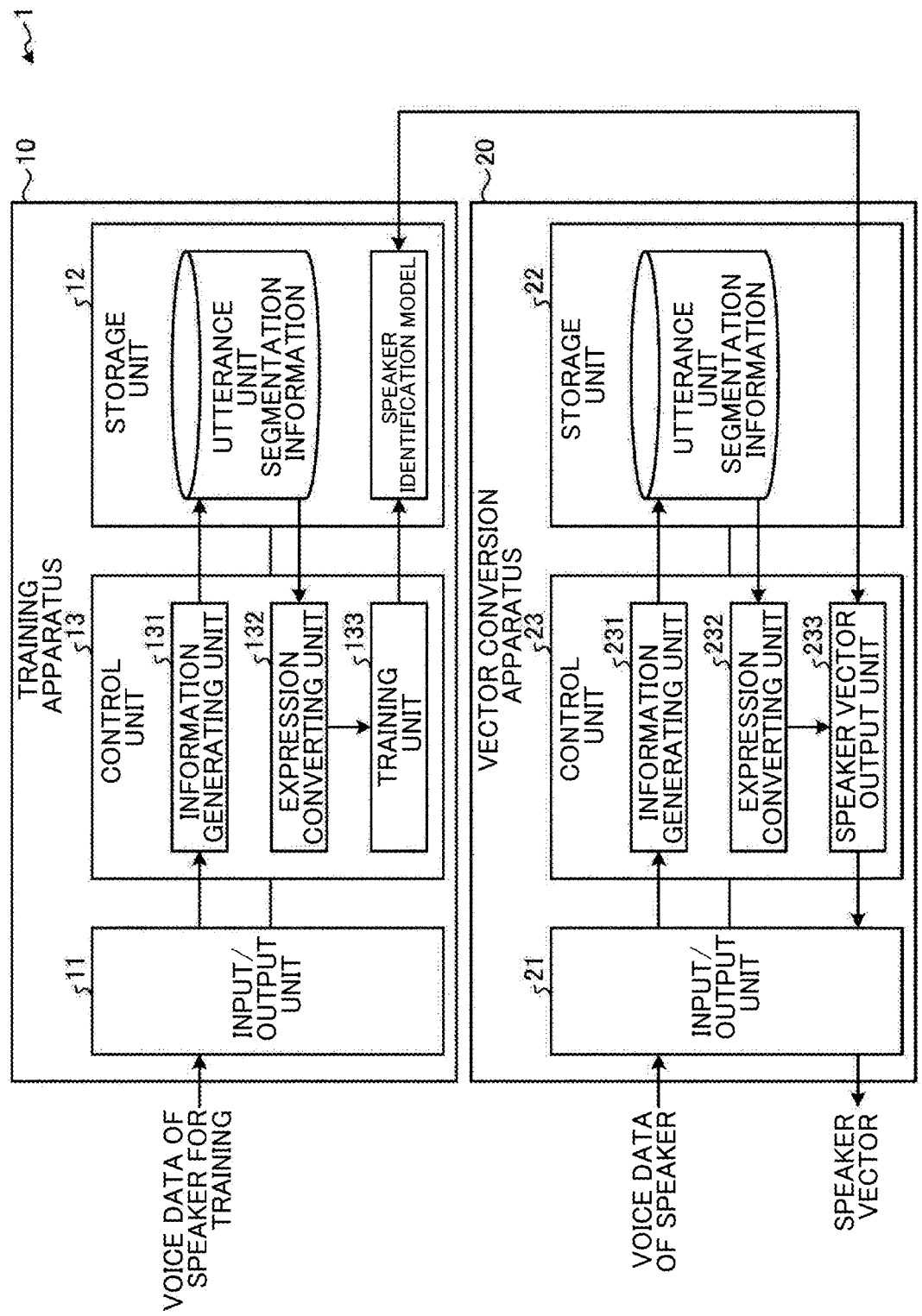
FIG. 2 is a diagram showing a configuration example of the speaker embedding system according to the first embodiment.

Next, a configuration example of the system will be described with reference to FIG. 2. As shown in FIG. 2, a system 1 includes a training apparatus 10 and a vector conversion apparatus 20. The training apparatus 10 trains the speaker identification model using utterance unit segmentation information. The vector conversion apparatus 20 converts input voice data of a speaker into a speaker vector using the speaker identification model after training.

[Training Apparatus]

Figure 3:
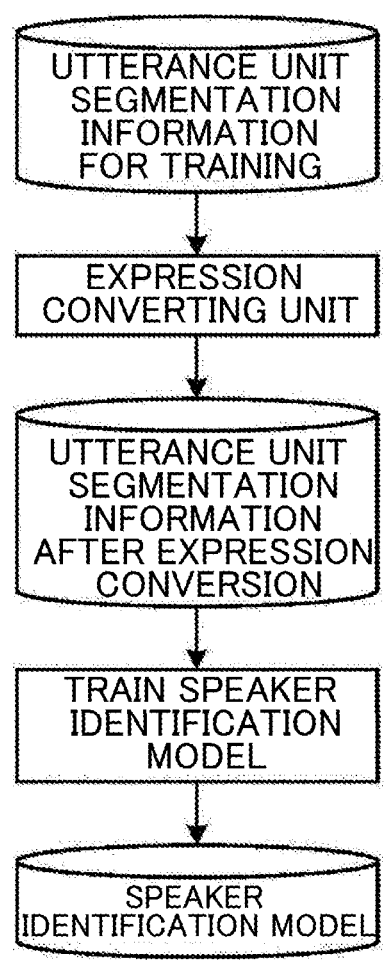
FIG. 3 is a diagram for explaining an outline of a training apparatus shown in FIG. 2.

For example, the training apparatus 10 performs expression conversion of utterance unit segmentation information for training with an expression converting unit 132. Subsequently, the training apparatus 10 trains the speaker identification model using the utterance unit segmentation information after expression conversion (refer to FIG. 3).

The training apparatus 10 includes an input/output unit 11, a storage unit 12, and a control unit 13. The input/output unit 11 controls input/output of various kinds of data. For example, the input/output unit 11 accepts input of voice data for training.

The storage unit 12 stores data to be referred to when the control unit 13 performs various types of processing and data generated by the control unit 13. For example, the storage unit 12 stores utterance unit segmentation information of voice data for training generated by the control unit 13, a speaker identification model trained by the control unit 13, and the like.

The control unit 13 controls the entire training apparatus 10 and includes, for example, an information generating unit 131, an expression converting unit 132, and a training unit 133.

Based on voice data of a speaker, the information generating unit 131 generates utterance unit segmentation information indicating a duration length for each utterance (for example, a phoneme) of the speaker. The utterance unit segmentation information is stored in, for example, the storage unit 12.

For example, using a voice recognition apparatus, the information generating unit 131 generates utterance unit segmentation information by adding a duration length for each phoneme to voice data of N-number of speakers being voice data for training. For example, as indicated by reference sign 101 in FIG. 1, the utterance unit segmentation information represents a duration length of a phoneme for each phoneme included in the voice data. The utterance unit segmentation information may include a start time and an end time of an utterance (for example, a phoneme) as indicated by reference sign 101.

The number of speakers in the voice data used to train the speaker identification model is, for example, several hundreds or more. In addition, the number of sentences uttered by each speaker is, for example, several tens or more.

The expression converting unit 132 converts the utterance unit segmentation information into an expression usable by the training unit 133. For example, the expression converting unit 132 converts the utterance unit segmentation information generated by the information generating unit 131 into a one-dimensional numerical expression.

For example, when the number of phonemes included in an n-th uttered sentence of a speaker s is expressed as $T_{sn}$, in a one-dimensional numerical expression, a duration length in the utterance unit segmentation information is treated as a one-dimensional vector $d_{sn}(t)$.

In addition, the expression converting unit 132 can also convert the utterance unit segmentation information into a one-hot expression shown in expression (1) below.

[Math. 1]

$$d_{sn}(t) = [d_{sn}(t)(1), \ldots, d_{sn}(t)(v), \ldots, d_{sn}(t)(V)] \quad \text{Expression (1)}$$

In the case of the one-hot expression shown in expression (1) above, $d_{sn}(t)$ (v) represents information of a v-th dimension of $d_{sn}(t)$. In addition, each dimension in $d_{sn}(t)$ corresponds to V-number of clusters obtained as a result of clustering the duration length for each utterance in the utterance unit segmentation information by, for example, a k-means method. For example, the expression converting unit 132 converts the utterance unit segmentation information into a vector in which the dimension ($d_{sn}(t)$ (v)) of a cluster v corresponding to a duration length for each utterance in the utterance unit segmentation information is given a value of 1 while other dimensions are given a value of 0.

The training unit 133 trains the speaker identification model using the utterance unit segmentation information after expression conversion by the expression converting unit 132. The speaker identification model is realized by a neural network which, for example, converts the utterance unit segmentation information after expression conversion (a one-dimensional numerical expression or a V-dimensional one-hot expression) into a one-hot expression (N-dimensional vector) of a speaker. For example, the neural network is represented as $f_{d \to p}$ in expression (2) below.

[Math. 2]

$$\hat{p}_{sn} = f_{d \to p}(d_{sn}) \quad \text{Expression (2)}$$

The neural network used for the speaker identification model may be a general Multilayer perceptron (MLP) or another neural network. For example, as the neural network used for the speaker identification model, a neural network capable of taking preceding and following words into consideration such as a Recurrent Neural Network (RNN) or an RNN-LSTM (RNN-Long Short Term Memory) may be used. Alternatively, the neural network used for the speaker identification model may be a combination of the neural networks described above.

[Vector Conversion Apparatus]

Next, the vector conversion apparatus 20 will be described. Hereinafter, the vector conversion apparatus 20 will be described using an example of a case where the speaker identification model used by the vector conversion apparatus 20 is a speaker identification model using a neural network.

Figure 4:
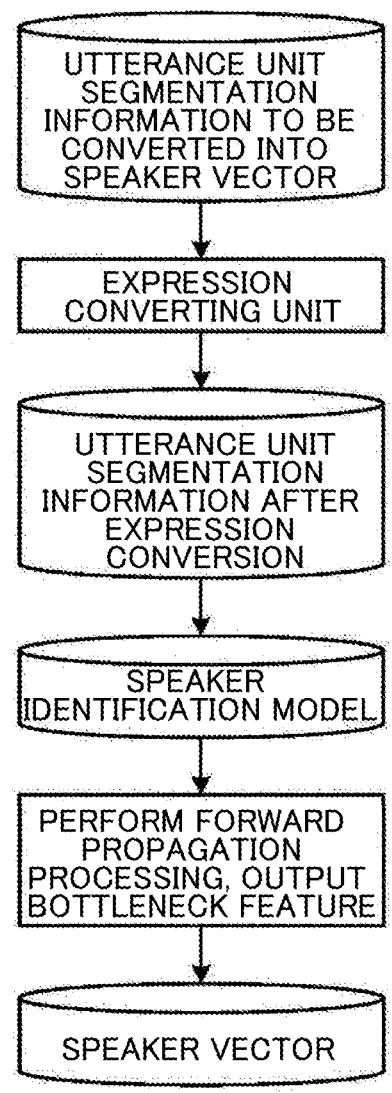
FIG. 4 is a diagram for explaining an outline of a vector conversion apparatus shown in FIG. 2.

The vector conversion apparatus 20 performs expression conversion of utterance unit segmentation information of voice data to be converted into a speaker vector using, for example, the expression converting unit 132. Next, the vector conversion apparatus 20 inputs the utterance unit segmentation information after expression conversion to the speaker identification model after training. Subsequently, the vector conversion apparatus 20 performs forward propagation processing of the neural network of the speaker identification model and outputs an arbitrary bottleneck feature of the neural network as a speaker vector of the speaker (refer to FIG. 4).

The vector conversion apparatus 20 includes an input/output unit 21, a storage unit 22, and a control unit 23. The input/output unit 21 controls input/output of various kinds of data. The input/output unit 21 accepts, for example, an input of voice data of a speaker to be converted into a speaker vector.

The storage unit 22 stores data to be referred to when the control unit 23 performs various types of processing and data generated by the control unit 23. For example, the storage unit 22 stores utterance unit segmentation information or the like generated by the control unit 23 to be converted into a speaker vector.

The control unit 23 controls the entire vector conversion apparatus 20 and includes, for example, an information generating unit 231, an expression converting unit 232, and a speaker vector output unit 233.

The information generating unit 231 generates utterance unit segmentation information indicating a duration length for each utterance of a speaker based on voice data of the speaker in a similar manner to the information generating unit 131 of the training apparatus 10.

For example, using a voice recognition apparatus, the information generating unit 231 generates utterance unit segmentation information by adding a duration length for each phoneme to voice data of a speaker to be converted into a speaker vector. The utterance unit segmentation information generated by the information generating unit 231 is stored in, for example, the storage unit 22.

The expression converting unit 232 converts the utterance unit segmentation information into an expression that can be processed by a speaker identification model. For example, the expression converting unit 232 converts the utterance unit segmentation information generated by the information generating unit 231 into a one-dimensional numerical expression in a similar manner to the expression converting unit 132 of the training apparatus 10.

The speaker vector output unit 233 converts the utterance unit segmentation information generated by the information generating unit 231 into a speaker vector using the speaker identification model after training. For example, the speaker vector output unit 233 inputs the utterance unit segmentation information after expression conversion by the expression converting unit 232 to the speaker identification model after training. Next, the speaker vector output unit 233 performs forward propagation processing of the neural network in the speaker identification model. Subsequently, the speaker vector output unit 233 outputs, as a speaker vector of the voice data input from the input/output unit 21, an output in an arbitrary intermediate layer (bottleneck feature) of the neural network.

As described above, since the system 1 uses utterance unit segmentation information indicating a duration length of an utterance unit of a speaker as a feature amount to be input to a speaker identification model, a speaker vector capturing an utterance rhythm of the speaker can be extracted.

[Example of Processing Procedure]

Next, an example of a processing procedure of the system 1 will be described with reference to FIGS. 5 and 6. First, the training apparatus 10 of the system 1 accepts input of voice data of a speaker for training (S1 in FIG. 5). Next, the information generating unit 131 of the training apparatus 10 generates utterance unit segmentation information of the voice data input in S1 (S2). Next, the expression converting unit 132 converts the utterance unit segmentation information generated in S2 into a one-dimensional numerical expression which can be processed by a speaker identification model (S3). Subsequently, the training unit 133 trains the speaker identification model using the one-dimensional numerical expression converted in S3 (S4).

Figure 5:
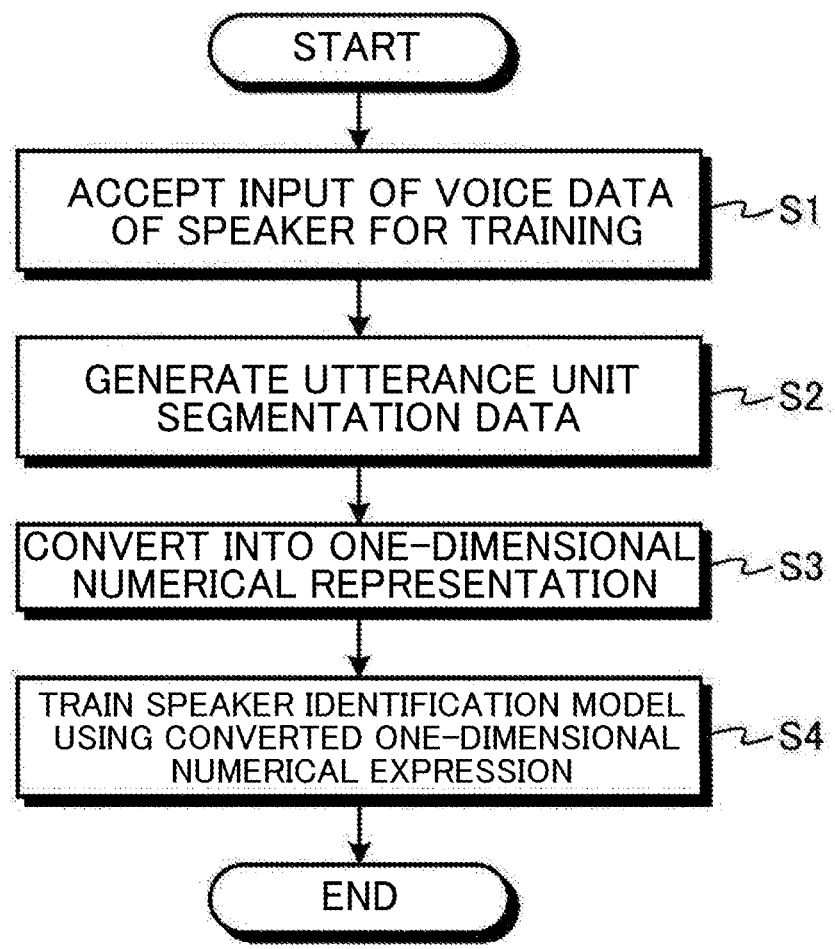
FIG. 5 is a flowchart showing an example of a processing procedure of the training apparatus shown in FIG. 2.
Figure 6:
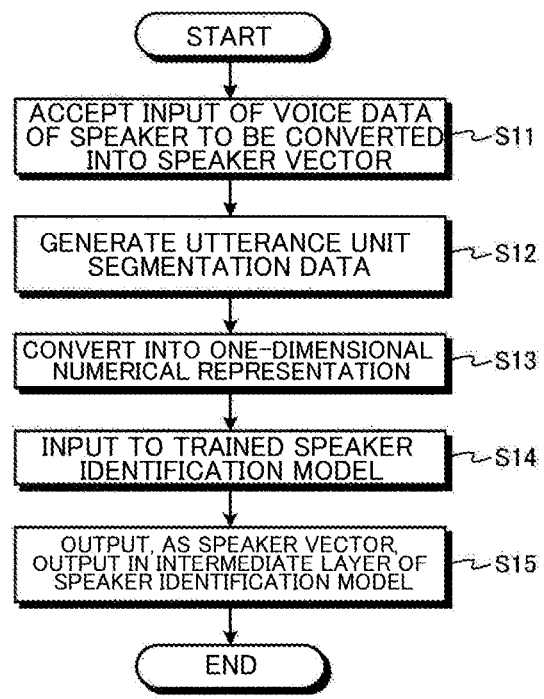
FIG. 6 is a flowchart showing an example of a processing procedure of the vector conversion apparatus shown in FIG. 2.

After S4 in FIG. 5, the vector conversion apparatus 20 accepts input of voice data of a speaker to be converted into a speaker vector (S11 in FIG. 6). Next, the information generating unit 231 of the vector conversion apparatus 20 generates utterance unit segmentation information of the voice data input in S11 (S12). Subsequently, the expression converting unit 232 converts the utterance unit segmentation information generated in S12 into a one-dimensional numerical expression which can be processed by the speaker identification model (S13).

Subsequently, the speaker vector output unit 233 inputs the one-dimensional numerical expression converted in S13 to a trained speaker identification model (S14). Next, the speaker vector output unit 233 outputs, as a speaker vector, an output in an intermediate layer of the speaker identification model (S15).

In this manner, the system 1 can extract a speaker vector capturing an utterance rhythm of a speaker.

Second Embodiment

Next, a second embodiment of the present invention will be described. Same components as those in the first embodiment will be denoted by same reference signs and a description thereof will be omitted.

The system 1 according to the second embodiment uses not only a duration length of an utterance included in utterance unit segmentation information but also information on the utterance (for example, information on a phoneme) to train a speaker identification model.

In other words, when converting utterance unit segmentation information into a one-dimensional notification expression that can be processed by a speaker identification model, the expression converting unit 132 of the training apparatus 10 and the expression converting unit 223 of the vector conversion apparatus 20 in the system 1 according to the second embodiment not only convert a duration length of an utterance included in the utterance unit segmentation information but also convert information on the utterance.

For example, the expression converting unit 132 of the training apparatus 10 converts a duration length in the utterance unit segmentation information into a one-dimensional numerical expression or a one-hot expression in a similar manner to the first embodiment. Next, the expression converting unit 132 converts information on the utterance (for example, a phoneme) in the utterance unit segmentation information into a one-hot expression.

For example, when the number of phonemes included in voice data for training is represented by I, $Ph_{sn}(t)$ is converted into a one-hot expression shown in expression (3) below.

[Math 3]

$$Ph_{sn}(t) = [Ph_{sn}(t)(1), \ldots, Ph_{sn}(t)(i), \ldots Ph_{sn}(t)(I)] \quad \text{Expression (3)}$$

In expression (3) above, $Ph_{sn}(t)$ (i) represents information on an i-dimension (i=1, . . . , I: number of phonemes included in voice data) of $Ph_{sn}(t)$. For example, the expression converting unit 132 converts the utterance unit segmentation information into a vector in which the dimension ($Ph_{sn}(t)$ (i)) corresponding to a phoneme name in the utterance unit segmentation information is given a value of 1 while other dimensions are given a value of 0. In addition, the expression converting unit 132 outputs a vector obtained by combining a vector $d_{sn}(t)$ related to the duration length and a vector $Ph_{sn}(t)$ related to the phoneme name included in the utterance unit segmentation information.

In addition, the training unit 133 trains the speaker identification model using the vector which is output from the expression converting unit 132 and which is obtained by combining the vector $d_{sn}(t)$ related to the duration length and the vector $Ph_{sn}(t)$ related to the phoneme name included in the utterance unit segmentation information.

In addition, with respect to utterance unit segmentation information of voice data to be converted into a speaker vector, the expression converting unit 223 of the vector conversion apparatus 20 outputs a vector obtained by combining a vector $d_{sn}(t)$ related to the duration length and a vector $Ph_{sn}(t)$ related to the phoneme name in a similar manner to that described above.

Subsequently, the speaker vector output unit 233 inputs the vector output by the expression converting unit 232 to the trained speaker identification model described above and outputs a speaker vector.

Accordingly, the system 1 can extract a speaker vector which more accurately captures an utterance rhythm.

Although the system 1 of each of the embodiments described above has a configuration including the training apparatus 10 and the vector conversion apparatus 20, the system 1 is not limited thereto. For example, the system 1 may include only the training apparatus 10 or the vector conversion apparatus 20. Furthermore, while utterance unit segmentation information is to be generated by the system 1, the utterance unit segmentation information is not limited thereto. For example, the system 1 may execute various kinds of processing using utterance unit segmentation information generated by an external apparatus.

[System Configuration and the Like]

In addition, each component of each unit illustrated in the drawings is simply a functional concept and need not necessarily be physically configured as illustrated in the drawings. In other words, the specific forms of dispersion and integration of each apparatus are not limited to those illustrated in the drawings and all of or a part of the apparatus may be functionally or physically distributed or integrated in any unit depending on various loads, usage conditions, or the like. Furthermore, all of or a part of each processing function performed in each apparatus may be realized by a CPU and a program to be executed by the CPU or realized as hardware by wired logic.

Furthermore, among the processing described in each embodiment, all of or a part of processing described as being performed automatically can also be performed manually and alternatively, all of or a part of processing described as being performed manually can also be performed automatically using known methods. In addition, information including processing procedures, control procedures, specific names, and various kinds of data and parameters described in the specification or shown in the drawings can be arbitrarily modified unless otherwise noted.

[Program]

The system 1 described above can be implemented by installing a program in a desired computer as packaged software or online software. For example, by causing an information processing apparatus to execute the program, the information processing apparatus can be caused to function as the system 1 according to each embodiment. The information processing apparatus as described herein includes a desktop personal computer or a notebook personal computer. In addition, the information processing apparatus also encompasses mobile communication terminals such as a smart phone, a mobile phone, and a PHS (Personal Handyphone System), terminals such as a PDA (Personal Digital Assistant), and the like.

In addition, when a terminal apparatus used by a user is considered a client, the system 1 may be implemented as a server apparatus which provides the client with services related to the processing described above. In this case, the server apparatus may be implemented as a Web server or as a cloud that provides services related to the processing described above by outsourcing.

Figure 7:
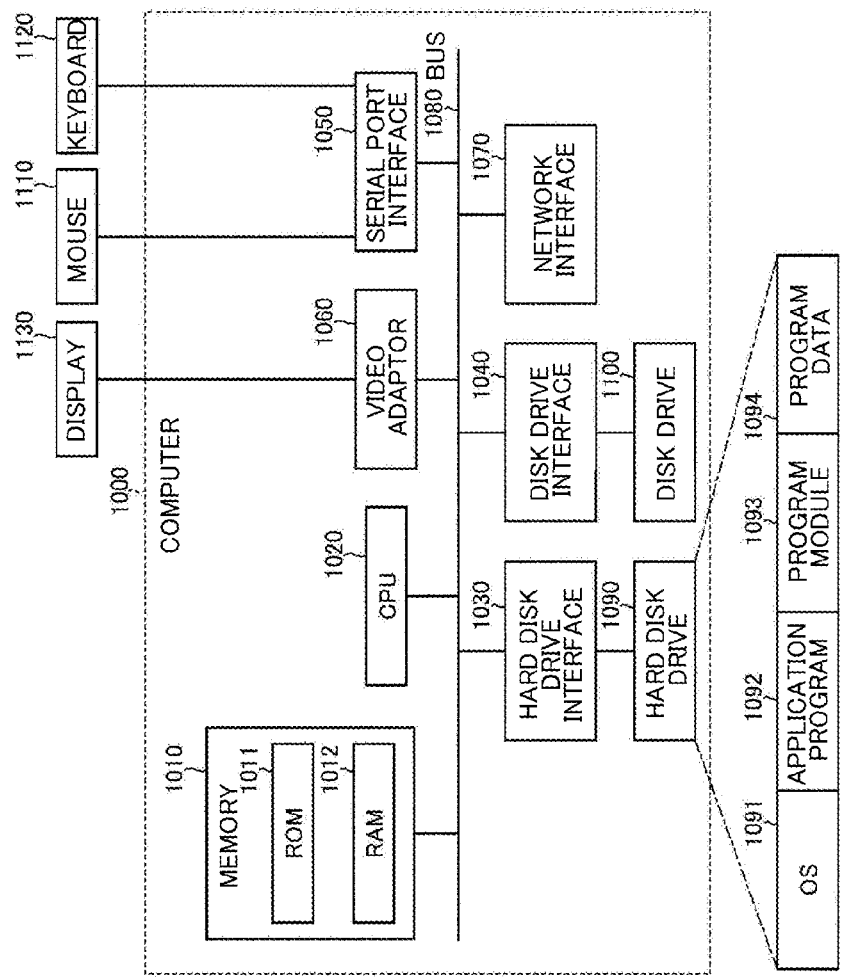
FIG. 7 is a diagram showing a configuration example of a computer that executes a speaker embedding program.

FIG. 7 is a diagram showing an example of a computer that executes a speaker embedding program. For example, a computer 1000 includes a memory 1010 and a CPU 1020. In addition, the computer 1000 includes a hard disk drive interface 1030, a disk drive interface 1040, a serial port interface 1050, a video adapter 1060, and a network interface 1070. These units are connected to one another by a bus 1080.

The memory 1010 includes a ROM (Read Only Memory) 1011 and a RAM (Random Access Memory) 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. For example, a detachable storage medium such as a magnetic disk or an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. In other words, a program that defines each processing executed by the system 1 described above is implemented as the program module 1093 in which is described a computer-executable code. The program module 1093 is stored in, for example, the hard disk drive 1090. For example, the program module 1093 for executing processing similar to the functional components in the system 1 is stored in the hard disk drive 1090. Note that the hard disk drive 1090 may be replaced by an SSD.

In addition, data used in processing in each embodiment described above is stored as the program data 1094 in, for example, the memory 1010 or the hard disk drive 1090.

Furthermore, the CPU 1020 reads out the program module 1093 or the program data 1094 stored in the memory 1010 or the hard disk drive 1090 to the RAM 1012 and executes the program module 1093 as necessary.

Note that the program module 1093 and the program data 1094 are not limited to being stored in the hard disk drive 1090 and may also be stored in, for example, a detachable storage medium to be read out by the CPU 1020 via the disk drive 1100 or the like. Alternatively, the program module 1093 and the program data 1094 may be stored in another computer connected via a network (a LAN (Local Area Network), a WAN (Wide Area Network), or the like). In addition, the program module 1093 and the program data 1094 may be read out from the other computer by the CPU 1020 via the network interface 1070.

REFERENCE SIGNS LIST

1 System
10 Training apparatus
11, 21 Input/output unit
12, 22 Storage unit
13, 23 Control unit
20 Vector conversion apparatus
131, 231 Information generating unit
132, 232 Expression converting unit
133 Training unit
233 Speaker vector output unit

The invention claimed is:

1. A speaker embedding apparatus comprising:
processing circuitry configured to:
accept input of voice data;
generate utterance unit segmentation information indicating a duration length for each utterance of a speaker in the input voice data; and
use a duration length for each utterance indicated in the generated utterance unit segmentation information as training data and train a speaker identification model for outputting an identification result of a speaker when a duration length for each utterance of the speaker is input,
the processing circuitry is further configured to:
accept input of voice data to be converted into a speaker vector,
generate the utterance unit segmentation information of the input voice data to be converted into a speaker vector, and
input a duration length for each utterance indicated in the generated utterance unit segmentation information to the speaker identification model after training and output, as a speaker vector of the voice data, an output in an intermediate layer of the speaker identification model.

2. The speaker embedding apparatus according to claim 1, wherein the processing circuitry is further configured to:
use utterances and a duration length for each of the utterances indicated in the utterance unit segmentation information as training data, and when utterances of a speaker and a duration length for each of the utterances are input, train a speaker identification model for outputting an identification result of the speaker.

3. The speaker embedding apparatus according to claim 2, wherein the processing circuitry is further configured to:
accept input of voice data to be converted into a speaker vector,
generate the utterance unit segmentation information of the input voice data to be converted into a speaker vector, and
input utterances and a duration length for each of the utterances indicated in the generated utterance unit segmentation information to the speaker identification model after training and output, as a speaker vector of the voice data, an output in an intermediate layer of the speaker identification model.

4. The speaker embedding apparatus according to claim 1, wherein the processing circuitry is further configured to:
convert a duration length for each utterance indicated in the generated utterance unit segmentation information into a one-dimensional numerical expression, and
train the speaker identification model using the converted one-dimensional numerical expression of the duration length for each utterance as training data.

5. The speaker embedding apparatus according to claim 4, wherein the processing circuitry is further configured to:
convert utterances and the duration length for each of the utterances indicated in the generated utterance unit segmentation information into a one-dimensional numerical expression, and
train the speaker identification model using the converted one-dimensional numerical expression of the utterances and the duration length for each of the utterances as training data.

6. A speaker embedding method executed by a speaker embedding apparatus, comprising:
accepting input of voice data;
generating utterance unit segmentation information indicating a duration length for each utterance of a speaker in the input voice data; and
using a duration length for each utterance indicated in the generated utterance unit segmentation information as training data and training a speaker identification model for outputting an identification result of a speaker when a duration length for each utterance of the speaker is input,
the speaker embedding method is further configured to:
accepting input of voice data to be converted into a speaker vector,
generating the utterance unit segmentation information of the input voice data to be converted into a speaker vector, and
inputting a duration length for each utterance indicated in the generated utterance unit segmentation information to the speaker identification model after training and output, as a speaker vector of the voice data, an output in an intermediate layer of the speaker identification model.

7. A non-transitory computer-readable recording medium storing therein a speaker embedding program that causes a computer to execute a process comprising:
accepting input of voice data;
generating utterance unit segmentation information indicating a duration length for each utterance of a speaker in the input voice data; and
using a duration length for each utterance indicated in the generated utterance unit segmentation information as training data and training a speaker identification model for outputting an identification result of a speaker when a duration length for each utterance of the speaker is input,
the process is further configured to:
accepting input of voice data to be converted into a speaker vector, generating the utterance unit segmentation information of the input voice data to be converted into a speaker vector, and inputting a duration length for each utterance indicated in the generated utterance unit segmentation information to the speaker identification model after training and output, as a speaker vector of the voice data, an output in an intermediate layer of the speaker identification model.

* * * * *